United States Patent [19]

Dodson

[11] Patent Number: 4,559,719

[45] Date of Patent: Dec. 24, 1985

[54] METHOD FOR PROCESSING MATTER IN A TURBULENT MASS OF PARTICULATE MATERIAL

[75] Inventor: Christopher E. Dodson, Reading, England

[73] Assignee: Torftech Limited, London, England

[21] Appl. No.: 554,682

[22] Filed: Nov. 23, 1983

Related U.S. Application Data

[62] Division of Ser. No. 391,927, Jun. 24, 1982, Pat. No. 4,479,920.

[30] Foreign Application Priority Data

Jun. 29, 1981 [GB] United Kingdom ................ 8119977
Jan. 6, 1982 [GB] United Kingdom ................ 8200311

[51] Int. Cl.⁴ .......................... B01J 8/38; F27B 15/08; F27B 15/10

[52] U.S. Cl. ........................................ 34/10; 34/57 A; 34/57 E; 406/108; 422/143; 422/145; 422/146; 422/213; 422/233; 431/7; 431/170; 432/15; 432/58

[58] Field of Search ............... 422/137, 143, 145, 146, 422/147, 233, 243, 213; 366/101, 165; 431/7, 170; 432/15, 58; 34/57 A, 57 E, 10; 406/108, 153, 194, 195; 106/DIG. 2; 65/21.4; 48/76, 77, 197 R; 241/47, 54

[56] References Cited

U.S. PATENT DOCUMENTS

3,136,536  6/1964  Heinemann .......................... 34/57 E
4,039,272  8/1977  Elliott .................................. 432/58
4,067,118  1/1978  Morin ................................ 34/57 A

Primary Examiner—Barry S. Richman
Assistant Examiner—William R. Johnson
Attorney, Agent, or Firm—Holman & Stern

[57] ABSTRACT

For processing matter in a turbulent mass of particulate material, a substantially annular processing region (14; 104; 206) is provided and is preferably in the form of a substantially annular processing chamber having a radially inner wall which includes a waist (38; 122). A flow of fluid and matter to be processed are admitted to the processing region through one or more inlets (28, 46; 108, 124; 214, 220) with the flow of fluid being directed generally circumferentially into the processing region. In the processing region, matter to be processed is embedded in a compact turbulent band of particulate material for processing. Once processing is complete, the processed matter is withdrawn from the processing region, preferably by entrainment in an exhaust flow of the fluid.

2 Claims, 7 Drawing Figures

METHOD FOR PROCESSING MATTER IN A TURBULENT MASS OF PARTICULATE MATERIAL

This is a divisional of application Ser. No. 391,927, filed June 24, 1982, now U.S. Pat. No. 4,479,920, patented Oct. 30, 1984.

BACKGROUND OF THE INVENTION

This invention concerns a method for processing matter in a turbulent mass of particulate material.

Processes in which matter to be processed is enveloped in a heated bed of particulate material for thermal treatment have been available for a number of years.

Currently, such processes are carried out in apparatus commonly known as a fluidised bed furnace. A conventional fluidised bed furnace comprises a housing providing a processing chamber which is partially filled with refractory particles. The floor of the chamber constitutes a perforate plate and, in use, a mixture of gas and combustion air is forced up through this plate. As a result, the particles in the chamber are supported and form a turbulent mass resembling a boiling liquid. This is the "fluidised bed". Heating of the bed is effected either by combustion of the gas/air mixture below the plate before it enters the chamber, or by internal combustion of this mixture within the bed.

Matter to be processed is supplied into the bed and mixes with the heated particles by virtue of the turbulence of the bed. Such matter is thus brought into intimate contact with the heated particles and, in this environment, is effectively heated and at the same time undergoes processing. After treatment, the processed matter is extracted from the bed.

In theory, the fluidised bed just described provides an effective heat transfer mechanism which offers benefits in a variety of thermal processing systems.

In practice, however, the application of fluidised bed furnaces has been limited because of difficulties over regulating the temperatures and transfer of heat inside the bed, and problems in separating the products of certain thermal processes from the bed at the appropriate moment.

Such drawbacks have various causes:

The application of heat to the bed is at least to some extent localised. And, because the bed as a whole remains static and fluidisation is achieved by a vertical flow of the gas/air mixture within the processing chamber, the lateral movement of the bed particles is random. Consequently, the transfer of heat to some regions of the bed may be limited with the result that a non-uniform heat distribution is obtained within it.

Also, the random movement of the particles tends to give rise to uneven horizontal mixing of the particles and matter to be processed which affects the exchange of heat between the two.

Further, the currents inside the bed may actively oppose or hinder the extraction of processed matter, when solids are among the products of the process. Since these currents have no fixed direction, the solids will not naturally be made to migrate to any particular area of the processing chamber for removal, nor will they have a natural tendency to separate from the particles in the bed when they are ready for extraction. Therefore, control of the withdrawal of solid products from the chamber and their retention time within the bed tends to be uncertain.

Not only do these factors make for inefficiencies in operation but also they render the furnace unsuitable for applications where the control of temperature or retention time for solids is critical.

BRIEF DESCRIPTION OF THE INVENTION

The present specification relates to a process in which matter to be processed is made to circulate, preferably with and within a turbulent mass of particulate material, about an axis of a processing chamber during treatment. A centrifugal effect is thus created which may be combined with the effects of gravity and a flow of fluid through the processing chamber to generate an environment where the treatment of matter and its extraction from the chamber after processing can be readily controlled.

More especially, matter to be treated is embedded and centrifugally retained within a compact but turbulent toroidal band of particles which are circulating about the axis of the processing chamber. There, the matter is processed and when processing is complete the products are automatically separated from the particulate mass by entrainment in a flow of fluid leaving the mass.

In other words, the process is particularly applicable to the treatment of matter whose reponse to forces such as gravity and centrifugal action varies on processing.

Accordingly, one aspect features a method for processing matter in a turbulent mass of particulate material, comprising:

generating a swirling flow of fluid within a processing region;

providing particulate material within said processing region;

employing said swirling flow of fluid to cause said particulate material to assume a compact band and circulate about an axis of said processing region in a turbulent manner;

supplying matter to be processed into said compact band of particulate material;

processing said matter within said compact band of particulate material; and withdrawing processed matter from said compact band of particulate material.

Each particle travels to and fro inside the processing region along the full length of the compact band and uniform processing conditions may be obtained. The motions of the particles within the particulate mass are determined by the combined effects of the fluid flow, gravity, and the centrifugal forces created by the swirling of the fluid, and the result is a thorough and continuous mixing of these particles and matter to be processed, on the supply of such matter into the band of particles. Consequently, a very efficient processing operation may be achieved using only a shallow band of particles.

An important aspect of the invention is the construction of the apparatus in which the method may be performed. This construction is designed to promote the formation of a turbulent circulating mass of particles in operation and to encourage natural separation from the mass of matter when processed.

In general terms, the apparatus comprises:

means defining a substantially annular processing region for receiving a mass of particulate material;

an inlet or inlets for admitting a flow of fluid and matter to be processed to said processing region;

means for directing said flow of fluid generally circumferentially of said processing region;

an outlet or outlets for said flow of fluid and for processed matter; and said means defining said processing region being profiled so as to maintain said mass of particulate material substantially in a compact turbulent band within said processing region in response to said flow of fluid in use.

The preferred embodiment has a flow regulating structure which is shaped to cause a variation in fluid velocity within the substantially annular processing region. By appropriate configuration of the flow regulating structure, such variation may be arranged to enhance mixing of the particles internally of the particulate mass, thereby enhancing the efficiency of processing. Advantageously, the flow regulating structure provides an area of reduced velocity in the processing region.

In accordance with this embodiment of the invention, processing apparatus comprises:

means defining a substantially annular processing chamber which is radially inwardly enlarged in a region between its axial limits;

an inlet or inlets for admitting a flow of fluid and matter to be processed to said processing chamber;

means for directing said flow of fluid generally circumferentially of said processing chamber to cause matter to be processed to circulate around said processing chamber for processing; and an outlet or outlets for said flow of fluid and for processed matter.

More especially, the means defining the substantially annular processing chamber may include a central, flow-regulating, structure which defines a radially inner wall of the chamber and which is formed with a waist providing the radially inwardly enlarged region.

There are numerous applications for the present invention, both in thermal processing and in chemical processing, and also in other fields such as grinding. For example, it may be employed in thermal processes including the gasification of solid fossil fuels and the expansion of e.g. leca, perlite, sand and vermiculite. It also has application in the drying of matter by heat, in the grinding of matter, and in the mixing of matter.

BRIEF DESCRIPTION OF THE DRAWINGS

The invention is described further, by way of example, with reference to the accompanying drawings, in which.

DETAILED DESCRIPTION OF THE PREFERRED EMBODIMENTS

Figure 1:
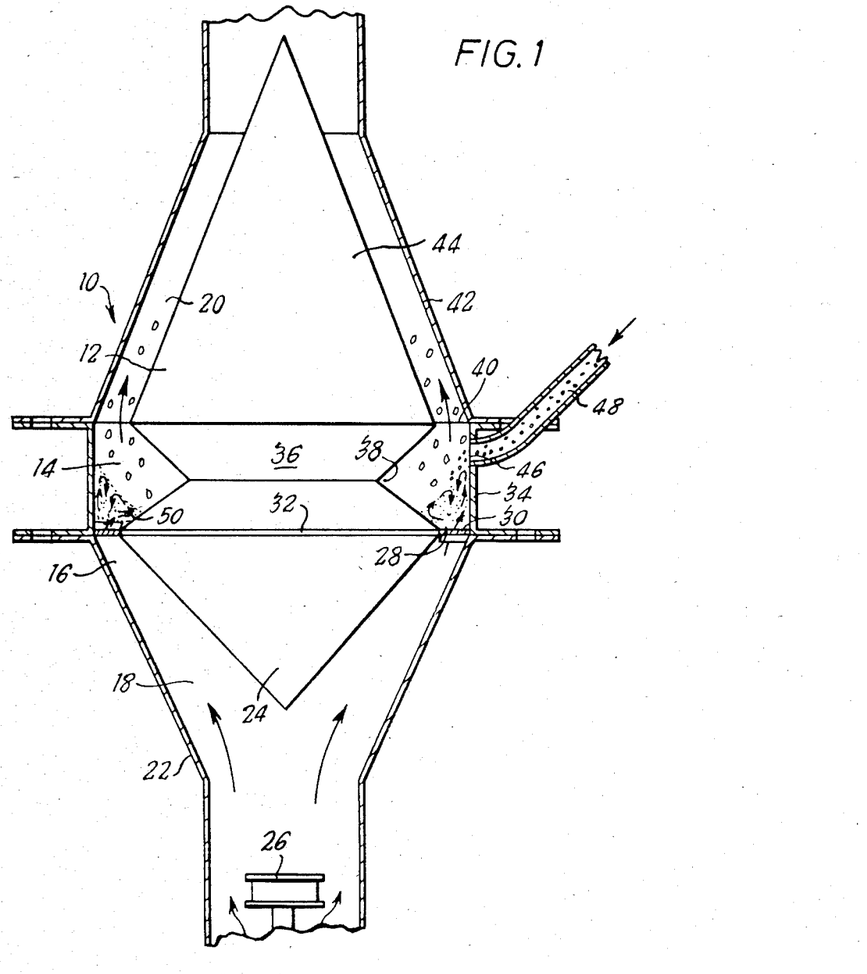
FIG. 1 is an elevation, partly in section, of a first embodiment of apparatus according to the invention.
Figure 2:
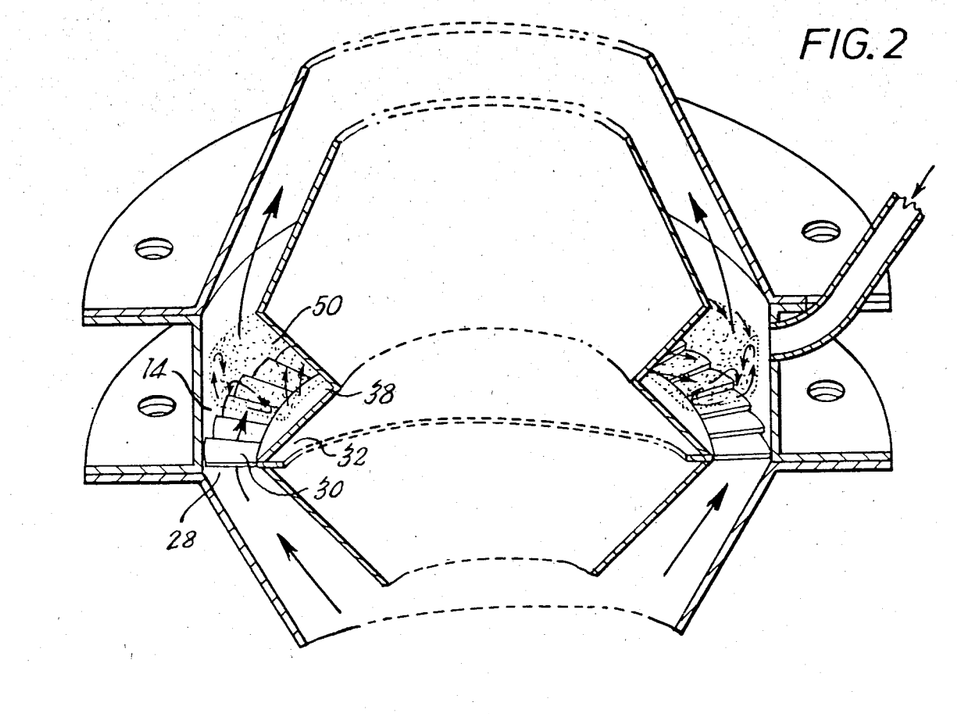
FIG. 2 is a fragmentary view of the same apparatus, again partly in section, showing in greater detail a processing chamber illustrated in FIG. 1.

Referring initially to FIGS. 1 and 2, these show apparatus according to the present invention which, in this instance, is employed as an expansion furnace in the expansion of perlite.

The furnace comprises a generally tubular housing 10 arranged with its axis vertical. A central structure 12 within the housing co-operates with it to define an annular processing chamber 14 and a fluid flow path 16 passing through the chamber 14. The flow path 16 has a lower section 18 for supplying a mixture of gas and combustion air generally upwardly into the annular chamber 14, and an upper section 20 for carrying exhaust fluid away from an upper region of the chamber 14.

As shown in FIGS. 1 and 2, the lower section 18 of the flow path 16 is defined by a funnel-shaped portion 22 of the housing 10 and a conical portion 24 of the central structure 12, both of which widen towards the annular chamber 14. Consequently, the flow cross-section, which is circular at the narrower end of the housing portion 22, is annular in the vicinity of the annular processing chamber 14. This annular flow cross-section is arranged to decrease in area towards the chamber 14.

Within the narrower end of the housing portion 22, there is a burner 26. Combustion air is supplied through the narrower end of the housing portion 22 in use and, mingling with gas from the burner 26, flows upwardly to the annular processing chamber 14. As a result of the decreasing section of the flow path the velocity of the fluid speeds up as it approaches this chamber.

Entry of the fluid into the chamber 14 is effected through an annular inlet opening 28 which is co-extensive with the region of the flow path 16 at the upper end of its lower section 18.

A plurality of vanes 30 are disposed in the inlet opening to impart rotational motion to the fluid flow entering the chamber 14 so that the fluid circulates about the axis of the chamber as it rises. These vanes form part of a circular disc 32 which rests in the upper end of the housing portion 22 and supports the central structure 12 inside the housing 10, being mounted between the conical portion 24 and the remainder of the central structure 12. The vanes lie around the periphery of the disc 32 and are simply angled away from the remainder of the disc about generally radially extending lines in the plane of the disc (see FIG. 2). As illustrated, each vane 30 spans the inlet opening 28 in the radial direction, and the vanes are equispaced about the opening 28 so that the supply of fluid to the chamber 14 is substantially evenly distributed around it.

This is an important feature of the apparatus.

The chamber 14 itself is defined between a cylindrical portion 34 of the housing 10 and a waisted portion 36 of the central structure 12. By virtue of the waist 38 in the portion 36 of the structure 12, the chamber 14 is radially inwardly enlarged in a region between its axial ends. Accordingly, the vertical component of the fluid flow passing through the chamber 14 is subject first to a decrease and then to an increase in velocity during the passage of the fluid.

The combined effects of the inclined vanes in the inlet opening 28 and the waist 38 in the central structure 12 on the fluid travelling along the path 16 result in a highly turbulent swirling flow in the chamber 14.

At the upper end of this chamber, there is an annular outlet opening 40 which is co-extensive with the region of the flow path 16 at the lower end of its upper section 20. This upper section 20 of the flow path 16 is provided by an inverted funnel shaped portion 42 of the housing 10 and a further conical portion 44 of of the central structure 12. The facing surfaces of the housing portion 42 and the conical portion 44 of the central structure are substantially parallel and converge away from the chamber 14. Thus, these members define an annular region in the flow path of decreasing cross sectional area in which the velocity of the fluid increases as the flow departs from the chamber 14.

One or more inlet openings to the chamber 14 are also provided in the wall of the cylindrical housing portion 34. A chute 48, from for example a hopper (not shown), leads to the or each inlet to supply firstly refractory particles and subsequently perlite to the chamber 14.

Operation of the apparatus is as follows:

A rising flow of heated fluid is generated within the lower section of the flow path 16 by supplying combustion air through the narrower end of the housing portion 22, supplying gas to the burner 26, and initiating combustion in the vicinity of the burner 26. The velocity of the fluid increases as it approaches the chamber 14.

On encountering the vanes 30, the heated fluid is deflected into the chamber 14 and caused to rotate about the chamber's axis whilst still rising. The fluid swirls around the chamber 14 in a turbulent fashion and then exhausts from the chamber through the annular outlet opening 40.

Particulate material is injected into the chamber 14 by way of the chute or chutes 48 and, under the influence of fluid in the chamber 14, becomes a turbulent mass heated by the fluid. The turbulent mass assumes the form of a compact toroidal band 50 within which the particles circulate.

Complex flows occur within this band under the combined effects of gravity, centrifugal action and gaseous flow, and the particles circulate both around the axis of the chamber 14 and to and fro within the band 50.

Although the theory behind the motion of the turbulent mass 50 has not yet been fully developed, it is believed that the circulation occurring within the turbulent mass has a first component flow and in some instances, but not all, also a second component flow.

These two component flows are illustrated in FIGS. 1 and 2 by arrows.

The first component flow is in the close vicinity of the wall of the cylindrical housing portion 34. Particles are lifted up against this wall by the rising flow of gas, and in the upper regions of the turbulent mass, tumble inwardly remaining close to the wall. At the same time, the particles are displaced circumferentially by the rotational movement of the fluid in the chamber.

The particles which circulate according to the second component flow follow a path which is directed inwardly and upwardly from the inlet opening with the entering fluid. As they reach the innermost edge of the turbulent mass 50, centrifugal forces take over and urge them generally outwardly again. The particles move outwardly, and also circumferentially, until they meet and merge with the particles in the first component flow. At this point, gravity dominates and the particles drop to the bottom of the bed for recirculation.

Observation of the mass 50 during testing suggests that this is what occurs within it, although the precise paths of the particles have not been determined.

It is thought that by appropriate adjustment of the velocity of the fluid flowing into the chamber 14 and the positioning of the vanes 30, the circulation of particles within the chamber 14 can be modified so that the first component flow predominates and the second disappears almost altogether. Then, the particles would flow up the outside of the mass 50, circumferentially and downwardly in the upper region of the mass to its inner area, and finally outwardly and circumferentially to repeat the cycle.

In any event, the motion of the particles in the toroidal band 50 causes very thorough mixing and a uniform distribution of heat throughout the band.

Once the circulating mass 50 has acquired a sufficiently high temperature, perlite is supplied to the chamber 14 by way of the chute or chutes 48. The perlite drops into the turbulent band and is held embedded there by gravity acting on it, whilst it mixes with the particles and is heated.

On heating, the perlite expands and becomes increasingly influenced by the rising flow of fluid passing through the chamber 14 due to change in density. As a result, the perlite has a tendency to migrate generally upwardly to the top of the turbulent mass with the fluid flow. Here, it is located towards the axial centre of the chamber 14 where the vertical velocity of the fluid is starting to increase. The perlite becomes entrained in the fluid and is lifted towards the annular outlet 40 at an increasing rate, being expelled from the chamber 14 with the exhaust fumes.

The apparatus has two significant advantages. Firstly, the high degree of turbulence within the particulate mass 50 and the circulation of the particles throughout the chamber 14 in the circumferential direction gives rise to a uniform temperature distribution within the mass and a very efficient transfer of heat between the particles, fluid and the perlite. Secondly, the fully expanded perlite separates naturally and automatically both from the circulating mass and from matter yet to be fully processed.

Figure 3:
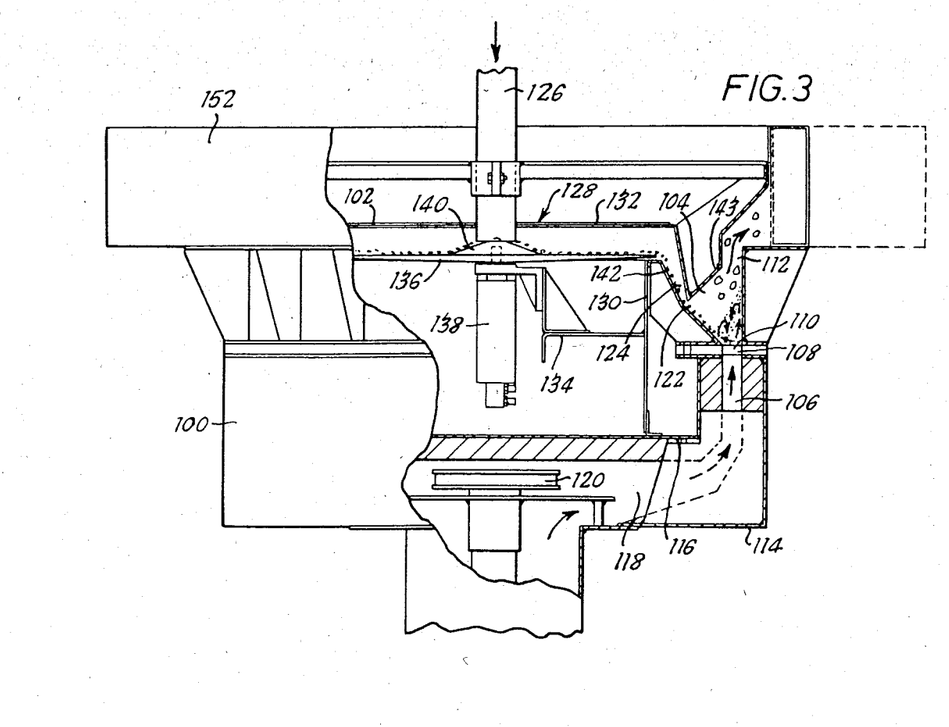
FIG. 3 is an elevation, partly in section, of a further embodiment of apparatus according to the invention.
Figure 4:
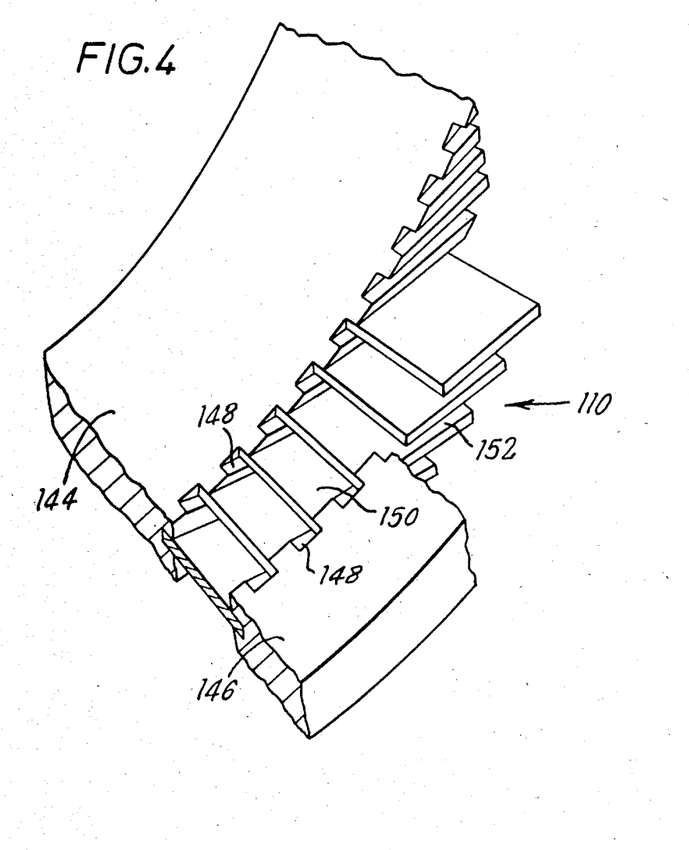
FIG. 4 is a fragmentary perspective view showing a detail of the apparatus of FIG. 3.

A further and preferred embodiment of the invention is illustrated in FIGS. 3 and 4. Although the construction of the apparatus shown in these figures differs from that already discussed, the principle of operation is the same.

This embodiment features a housing 100 containing a central structure 102, and defining with this structure an annular processing chamber 104 through which a fluid flow path 106 extends vertically.

As before, the central structure 102 is waisted, providing a radially inwardly enlarged region in the chamber 104 between its axial limits. An annular inlet opening 108 for fluid is situated at the base of the chamber 104 and contains a plurality of overlapping vanes 110. Also, the chamber constricts upwardly towards an annular outlet opening 112 for exhaust fluid and expanded perlite.

Lower portions 114, 116 of the housing 100 and central structure 102 respectively, together define a lower section 118 of the flow path 106. This lower section 118 of the flow path 106 is generally annular and decreases in cross-section as it approaches the chamber 104. Combustion air is supplied into the lower region of this flow path section 118 where a burner 120 burns the air with the gas to generate a heated flow of fluid rising into the chamber 104.

On entering the chamber, the heated fluid is deflected circumferentially by the vanes 110, and within the chamber it swirls and becomes turbulent by virtue of the waist 122 in the central structure 102.

In these respects, the apparatus illustrated in FIGS. 3 and 4 is substantially the same as that of FIGS. 1 and 2.

The present embodiment differs from the preceding one chiefly in the arrangement by which particulate material and perlite are supplied to the processing chamber, and additionally in the design of the support structure for the vanes and the exhaust section of the flow path 106.

In this case, the furnace features a continuous annular inlet opening 124 for the particulate material and, later, the perlite, which is situated in the central structure 102 at its waist 122. Particulate material and perlite are supplied to this opening 124 by way of a chute 126, and a distribution arrangement 128 located internally of the central structure 102.

More especially, the central structure 102 is divided into two separate parts in the present instance. These comprise a lower part 130 which includes the lower portion 116 of the structure 102, and an upper part 132. Both parts are supported by and fixed relative to the housing.

The lower part 130 includes a support 134 for a rotatable disc 136 and a motor 138, the motor being operable to rotate the disc. The disc 136 has a central bump 140 as shown in FIG. 3, and its periphery co-incides with the upper edge of a substantially frustoconical outer wall 142 of the lower part 130. A portion of the wall 142 serves as the lower portion of the radially inner wall of the chamber 104 below the waist 122.

The upper part 132 of the central structure 102 serves to support the chute 126 above the bump 140 in the disc 136, and has a frustoconical wall 143 providing the upper portion of the radially inner wall of the chamber 104 above the waist 122.

In use, the disc 136 is set into motion by the motor 138, and particulate material is supplied into the chute 126. The particles drop onto the bump 140 and are flung outwardly towards the periphery of the disc 136.

From the disc periphery, the particles fall downwardly over the wall 142 in a thin curtain into the chamber 104. Thus, the particles are uniformly distributed around the chamber 104.

Heated fluid is driven upwardly into the chamber 104, and the particles form a heated turbulent toroidal mass behaving in the manner described in relation to FIGS. 1 and 2.

Then, the perlite is injected into the chamber 104 by way of the chute 126 and rotating disc 136. Like the particulate material, the perlite falls as a thin curtain into the chamber 104 and is evenly distributed around the chamber. This promotes particularly efficient mixing of the perlite with the turbulent mass.

Turning to FIG. 4, this shows the vane structure of the present embodiment which serves to deflect fluid entering the chamber 104 in a circumferential direction. The vane structure comprises an inner ring 144 forming part of the lower part 130 of the central structure 102, and an outer ring 146 forming part of the housing 100. The two rings 144, 146 face one another and have regularly spaced slots 148 in their opposed faces. The slots 148 are arranged in corresponding pairs, one in each ring 144, 146 and are inclined in relation to the plane surfaces of these rings. A respective vane 150 is fitted into each corresponding pair of slots.

As illustrated, the vanes thus overlap to a significant extent and define narrow flow passages 152 between one side of the vane structure and the other.

This promotes a clean flow in the fluid entering the chamber 104. Such controlled flow assists in supporting the turbulent toroidal mass above the vanes 110 and in inhibiting particles from falling through the vanes into the lower section 118 of the flow path 106.

The exhaust section of the flow path 106 is arranged as follows:

At the upper end of the chamber 104, the flow path 106 is directed radially into a scroll shaped upper portion 152 of the housing 100, which is hollow. The expanded perlite leaving the chamber 104 is flung outwardly into this housing portion 152 and flows round it to an outlet (not shown) at its outer-most end. The swirling motion of the fluid and expanded perlite leaving the chamber 104 assists in carrying the particles to the outlet.

This embodiment of the invention is particularly advantageous for a number of reasons. Each opening into and out of the chamber 104 embraces its full circumference so that the supply of fluid and other matter into the chamber and the exhaust of products from the chamber occurs uniformally over its entire operational extent. Efficient processing is a natural consequence of this. Another advantage lies in the construction and arrangement of the vanes 110 as mentioned above.

Figure 5:
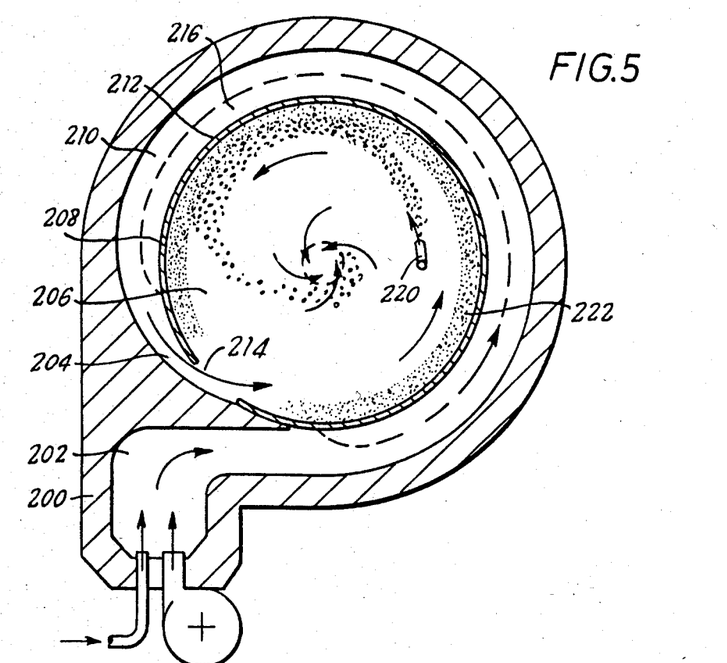
FIG. 5 is a plan section through a further embodiment of apparatus according to the invention.
Figure 6:
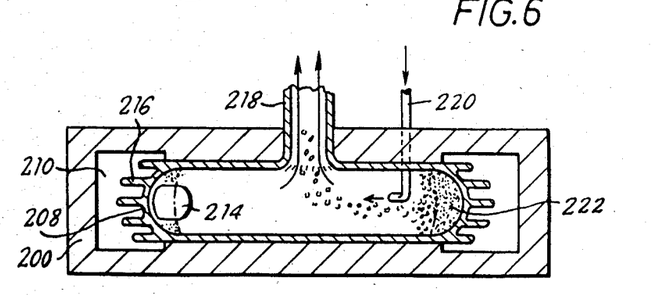
FIG. 6 is a vertical section through the apparatus of FIG. 5.

FIGS. 5 and 6 show an alternative form of apparatus according to the invention.

This comprises an outer housing 200. The housing 200 defines a combustion chamber 202 and a heating chamber 204. Within the chamber 204, there is a processing chamber 206 formed by a shallow, roughly cylindrical, hollow body 208.

The housing 200 is arranged to contact the body 208 at top and bottom, but so that a helical flow path 210, leading from the combustion chamber 202, is provided between the housing 200 and the circumferential wall 212 of the body 208. The path 210 leads to an inlet opening 214 in the wall 212 as shown.

Gas and combustion air are supplied in use to the chamber 42 where combustion takes place, and the fluid then circulates around the circumference of the body 208 before entering the processing chamber 206. The exterior of the body 208 is thus heated and, to promote an even temperature along the wall 212, a plurality of annular ribs 216 are provided. The body 208 and ribs 216 are formed mainly from a material such as cast iron or ceramic.

The hot gas enters the processing chamber 214 in a generally tangential manner through the inlet 204 and, thereafter, initially tends to follow the interior of the wall 212 round the chamber. The fluid is then exhausted from the chamber 206 through an outlet 218 formed in the top of the body 208 in its axial direction.

An additional inlet 220 extends into the chamber 202 through the top of the body 208 and the adjacent wall of the housing 200. This inlet 220 serves initially for supplying particulate material and subsequently for injecting perlite into the chamber 206. The inlet 220 is arranged radially inwardly of the wall 212 so as to direct the particulate material and the perlite tangentially of the chamber.

In operation, heated fluid is caused to flow round the exterior and then the interior of the wall 212 before being exhausted through the outlet 218. Particulate material is supplied into the chamber 206 and, under the influence of the fluid flow, hugs the inside of the wall 212 and is caused to flow in a turbulent manner about the annular exterior region of the processing chamber 206. The fluid rotating about the axis of the chamber 206 causes this turbulent mass to rotate and to be urged continually outwards against the wall 212 and the mass, therefore, forms a compact toroidal band 222.

This band 222 is heated both by the transfer of heat through the wall 212 and by the heat of the fluid circulating within the chamber 206.

When perlite is added to the chamber 206, it is flung forcefully outwards against and into the turbulent band 222 and is heated therein. As the perlite expands, it tends to work its way towards the inner edge of the band 222 and it becomes entrained in the flow of fluid passing to the outlet 218.

The fluid and expanded perlite are exhausted from the chamber together.

Figure 7:
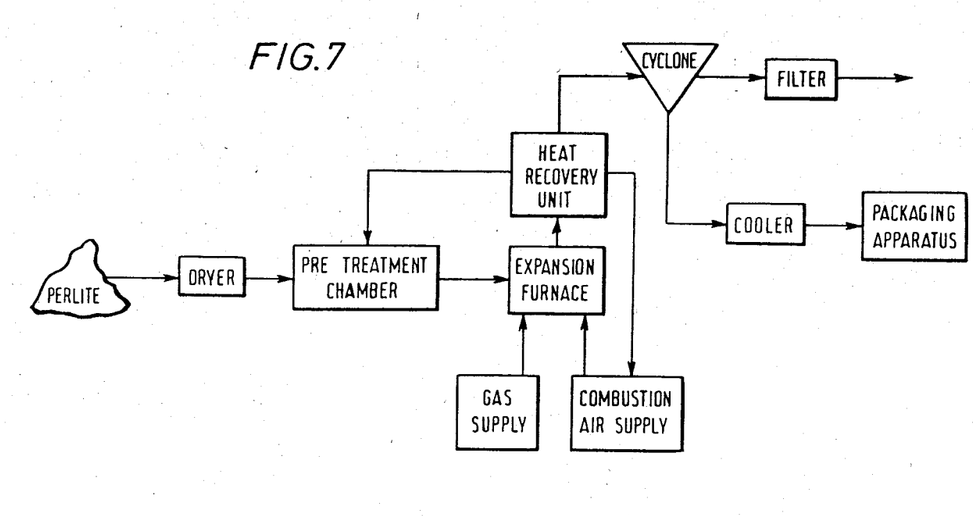
FIG. 7 is a flow diagram of a process for expanding perlite employing the present invention.

A process for expanding perlite employing the present invention is shown diagrammatically in FIG. 7.

A supply of perlite in its natural condition is fed to a drier and a pre-treatment chamber in a conventional manner. In the pre-treatment chamber, the perlite is heated to a temperature of 250 degrees to 300 degrees centigrade, in preparation for insertion into the expansion furnace according to the invention.

Gas and combustion air are provided from supplies of the same and are impelled into the expansion unit where they are combusted to achieve an internal temperature in the range of 900 degrees to 1100 degrees centigrade. The perlite added into the expansion furnace is thus heated and expanded to form insulating material.

A stream of hot exhaust fluid carrying the expanded perlite and products of combustion is expelled from the expansion furnace into a heat recovery unit where heat is withdrawn and redirected to the pre-treatment chamber for initial heating of the perlite and to the combustion air supply for pre-heating this air.

The cooled exhausts from the expansion furnace then pass to a cyclone for separating the expanded perlite from the fluid and any small contaminent particles.

The fluid is expelled into the atmosphere by way of a filter for collecting such particles, and the expanded perlite is conveyed, by way of an additional cooler, to packaging apparatus.

Vermiculite can also be expanded in any of the furnaces illustrated in FIGS. 1 to 6 and by the system shown in FIG. 7.

Other applications for the invention include the gasification of solid fossil fuels. In this instance, one of the two furnaces described with reference to FIGS. 1 to 4 is preferably used and instead of arranging for combustion of the gas/air mixture to take place in the lower section of the flow path and below the vanes in the inlet to the processing chamber, the mixture is ignited within the turbulent mass in the chamber.

The apparatus described may also be employed for grinding purposes. The fluid supplied to the processing chamber may or may not then be heated but the rate of flow must be controlled to ensure very rapid circulation of the particulate material in the turbulent mass. Then, when matter to be processed is supplied to the chamber and becomes embedded in the particulate mass, the frictional forces generated by the rapid turbulent motion of the particles abrades the matter to be processed and can reduce it to a fine powder.

In experimental testing of the apparatus shown in FIGS. 1 to 4, it has been found that, in fact, processing of certain matter, for example perlite and vermiculite, will occur in the absence of the toroidal band of particulate material. Then, on insertion into the processing chamber, the matter to be processed itself forms a turbulent toroidal band which is processed, as by heating, simply by the swirling flow of fluid. The overall operation is not so efficient but nevertheless processing can be achieved.

As has been mentioned previously, although in the described embodiments combustion of the gas and air is effected outside the processing chamber, this is not essential. Combustion can be made to take place within the chamber if desired.

Various modifications can also be made in the construction of the apparatus.

For example, instead of forming the waist in the central structure in the manner illustrated in FIGS. 1, 2 and 3 by arranging two frustoconical wall portions of this structure in inverted relation and thereby defining a precisely angled corner in the processing chamber, the waist may be defined by a radially inwardly curved wall portion of the central structure. Also, it should be noted that where the waist is defined by frustoconical wall portions of the central structure, the cone angles of each may be either the same or different.

Alternative arrangements for the vanes of the two furnaces shown in FIGS. 1 to 4 are also possible. In these two embodiments, each vane is inclined only about a radially extending line. However, each vane may be lifted at its outer edge as well so that it is inclined both in the generally circumferential direction of the annular inlet opening for fluid and in the generally radial direction. This would result in a change in the particle flows within the turbulent toroidal mass but would still generate a high degree of mixing of the particles.

A further modification resides in the provision of an additional outlet at or adjacent the lower end of the annular processing chamber in the furnaces of FIGS. 1 to 4. For example, referring to FIG. 1, the cylindrical portion 34 of the housing 10 may be somewhat enlarged relative to the wider end of the housing portion 22 and a substantially annular opening may be created at the lower outer edge of the processing chamber 14. Any relatively heavy matter or particles in the circulating band of particulate material will have a tendency to gravitate to this region and will consequently drop from the chamber 14. The construction of the furnace shown in FIG. 3 may be altered in a similar manner. Such arrangements are advantageous for separating relatively heavy particles of processed or waste matter from the toroidal band in a manner which does not block the annular inlet opening to the processing chamber. Consequently, these arrangements may be useful, for example, in instances where the or some of the processed matter is too heavy to be easily extracted from the processing chamber by entrainment in the exhaust flow of gas or where the supply of matter to be processed is contaminated.

The described constructions make for compact, and therefore easily insulated, apparatus. A stable temperature may be obtained within the processing chamber and thorough mixing of matter to be processed and particles in the turbulent mass occurs. The retention time of matter being processed in the turbulent mass can also be accurately determined to obtain the optimum results. Consequently, efficient processing can be realised in a practical manner.

I claim:

1. A method for processing matter in a turbulent mass of particulate material, comprising:
generating a swirling flow of fluid within an annular processing zone which is radially, inwardly enlarged in a region between the upper and lower axial limits of said zone by imparting a rotational motion upon a fluid stream which is introduced through the lower axial limit of said zone;

introducing a stream of particulate material into said enlarged region so as to entrain the particulates within said fluid stream, wherein the shape of the zone maintains a compact, annular turbulent band of said particulate material in response to the flow rate of the fluid stream;

processing said particulate material within said zone and;

removing the processed material and fluid from said annular processing zone.

2. The method of claim 1 wherein said fluid stream further causes said compact band of particulate material to circulate and flow generally vertically through said processing zone.

* * * * *